(12) United States Patent
Okuno

(10) Patent No.: US 7,162,129 B2
(45) Date of Patent: Jan. 9, 2007

(54) OPTICAL TRANSMISSION LINE AND OPTICAL TRANSMISSION SYSTEM

(75) Inventor: Toshiaki Okuno, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 244 days.

(21) Appl. No.: 10/829,454

(22) Filed: Apr. 22, 2004

(65) Prior Publication Data

US 2004/0247270 A1 Dec. 9, 2004

(30) Foreign Application Priority Data

Apr. 22, 2003 (JP) .............................. 2003-117268

(51) Int. Cl.
*G02B 6/02* (2006.01)
*H04B 10/12* (2006.01)
(52) U.S. Cl. ........................................ 385/123; 398/201
(58) Field of Classification Search ................. 385/24, 385/123, 126, 127; 398/201
See application file for complete search history.

(56) References Cited

U.S. PATENT DOCUMENTS

| | | | |
|---|---|---|---|
| 5,778,128 A | 7/1998 | Wildeman | |
| 5,995,694 A | 11/1999 | Akasaka et al. | |
| 6,084,993 A | 7/2000 | Mukasa | |
| 6,157,754 A * | 12/2000 | Sasaoka et al. | 385/24 |
| 6,178,279 B1 | 1/2001 | Mukasa et al. | |
| 6,512,872 B1 * | 1/2003 | Sugizaki et al. | 385/123 |
| 6,535,677 B1 * | 3/2003 | Tanaka et al. | 385/123 |
| 6,721,481 B1 * | 4/2004 | Terahara et al. | 385/122 |
| 6,907,172 B1 * | 6/2005 | Okuno et al. | 385/126 |

FOREIGN PATENT DOCUMENTS

| | | |
|---|---|---|
| JP | 9-318824 | 12/1997 |
| JP | 10-73738 | 3/1998 |
| JP | 10-325913 | 12/1998 |
| JP | 11-84158 | 3/1999 |

OTHER PUBLICATIONS

Chraplyvy, A.R., et al. "160-Gb/s (8×20Gb/s WDM) 300-km Transmission With 50-km Amplifier Spacing and Span-by-Span Dispersion Reversal." AT&T Bell Laboratories pp. 92-95.

* cited by examiner

*Primary Examiner*—Sung Pak
*Assistant Examiner*—Tina M. Wong
(74) *Attorney, Agent, or Firm*—McDermott Will & Emery LLP

(57) ABSTRACT

An optical transmission line and an optical transmission system capable of preventing signal distortion over a wide wavelength range are provided. The optical transmission line comprises a first negative dispersion fiber having an absolute value of a dispersion slope of not larger than 0.03 ps/nm$^2$/km and overall dispersion of not larger than −5 ps/nm at one wavelength in the range of 1450 nm to 1600 nm, and a positive dispersion fiber, which are disposed in this order in a direction of transmission of signal light. The optical transmission system comprises a transmitter and an optical transmission line, the line comprising a first optical fiber disposed on the most upstream side and a second optical fiber spliced to the first optical fiber. The first optical fiber has negative chromatic dispersion and an absolute value of a dispersion slope of not larger than 0.03 ps/nm$^2$/km at any one wavelength of the signal light. An absolute value of the sum of overall dispersion of the first optical fiber and overall dispersion of the second optical fiber is smaller than an absolute value of the overall dispersion of the first optical fiber.

4 Claims, 12 Drawing Sheets

OPTICAL TRANSMISSION LINE AND OPTICAL TRANSMISSION SYSTEM

BACKGROUND OF THE INVENTION

1. Field of the Invention

The present invention relates to an optical transmission line suitable for use in a Wavelength Division Multiplexing (WDM) optical transmission system, and relates to the WDM optical transmission system.

2. Description of the Related Art

A WDM optical transmission system is to transmit a plurality of multiplexed signals having different wavelengths through an optical transmission line, and can transmit a large volume of information over a long distance. Recently, there has increased a demand for an optical transmission system having a larger capacity and covering a longer distance. Preventing signal distortion is important to satisfy such a demand. From this point of view, it is desired that an absolute value of accumulated dispersion of an entire optical transmission line be small over a long distance and the optical Kerr effect be small in the optical transmission line.

Japanese Unexamined Patent Application Publication No. 9-318824 discloses an optical transmission line comprising two positive dispersion fibers and one negative dispersion fiber inserted between them. In the disclosed optical transmission line, an absolute value of accumulated dispersion of the entire optical transmission line is reduced by combination of the positive dispersion fibers and the negative dispersion fiber. Also, the positive dispersion fiber having a large effective core area is disposed in the most upstream part of the optical transmission line to prevent signal distortion caused by the optical Kerr effect.

SUMMARY OF THE INVENTION

It is an object of the present invention to provide an optical transmission line and an optical transmission system, which are able to prevent signal distortion over a wide wavelength range.

To achieve the above object, the present invention provides an optical transmission line comprising a first negative dispersion fiber having an absolute value of a dispersion slope of not larger than 0.03 $ps/nm^2/km$ and overall dispersion of not larger than −5 ps/nm at one wavelength in the range of 1450 nm to 1600 nm, and a positive dispersion fiber.

According to one aspect, the optical transmission line further comprises a second negative dispersion fiber. The first negative dispersion fiber is spliced to one end of the positive dispersion fiber, and the other end of the positive dispersion fiber is spliced to the second negative dispersion fiber. The sum of overall dispersion of the first negative dispersion fiber and overall dispersion of the positive dispersion fiber is not smaller than 5 ps/nm at the one wavelength, and overall dispersion of the second negative dispersion fiber is not larger than −5 ps/nm at the one wavelength.

According to another aspect, the optical transmission line further comprises an intermediate fiber having overall dispersion of substantially 0 ps/nm at the one wavelength. The first negative dispersion fiber is spliced to one end of the intermediate fiber, and the other end of the intermediate fiber is spliced to the positive dispersion fiber. The sum of overall dispersion of the first negative dispersion fiber and overall dispersion of the positive dispersion fiber is not smaller than 0 ps/nm at the one wavelength. The intermediate fiber may be a dispersion shifted fiber or a dispersion managed fiber.

According to still another aspect, the first negative dispersion fiber is spliced to the positive dispersion fiber. The sum L of a length of the first negative dispersion fiber and a length of the positive dispersion fiber is not smaller than 10 km, and the sum of overall dispersion of the first negative dispersion fiber and overall dispersion of the positive dispersion fiber is not smaller than 5 ps/nm but not larger than 0.5 ps/nm/km×L at the one wavelength.

Furthermore, the present invention provides an optical transmission system comprising a transmitter for outputting signal light, and an optical transmission line for transmitting the signal light outputted from the transmitter. The optical transmission line comprises a first optical fiber disposed on the most upstream side of the optical transmission line, and a second optical fiber spliced to the first optical fiber. The first optical fiber has negative chromatic dispersion and an absolute value of a dispersion slope of not larger than 0.03 $ps/nm^2/km$ at any one wavelength of the signal light. An absolute value of the sum of overall dispersion of the first optical fiber and overall dispersion of the second optical fiber is smaller than an absolute value of the overall dispersion of the first optical fiber at the one wavelength.

Advantages of the present invention will become readily apparent from the following detailed description, which illustrates the best mode contemplated for carrying out the invention. The invention is capable of other and different embodiments, the details of which are capable of modifications in various obvious respects, all without departing from the invention. Accordingly, the drawing and description are illustrative in nature, not restrictive.

BRIEF DESCRIPTION OF THE DRAWINGS

The present invention is illustrated by way of example, and not by way of limitation, in the figures of the accompanying drawing in which like reference numerals refer to similar elements and in which.

DESCRIPTION OF THE PREFERRED EMBODIMENTS

In the optical transmission system disclosed in Japanese Unexamined Patent Application Publication No. 9-318824, a pulse of signal light is compressed in the positive dispersion fiber disposed at the most upstream part of the optical transmission line. This raises the problem that peak power of the signal light pulse is increased and the signal distortion caused by the optical Kerr effect is accelerated. Further, in the positive dispersion fiber, the change in waveform of signal light becomes complicated since a chirp component generated in the signal light due to optical Kerr effect resides inside a pulse in the time domain.

In the WDM optical transmission, a wider wavelength range of the signal light is demanded for the purpose of increasing the number of channels and realizing higher-speed transmission for larger volume information. However, when an optical fiber constituting the optical transmission line has a large absolute value of dispersion slope, the signal light wavelength practically usable at a satisfactory level is limited to a narrow range, since the non-linear interaction between the signals is increased in a wavelength band in which an absolute value of chromatic dispersion is small.

Figure 1:
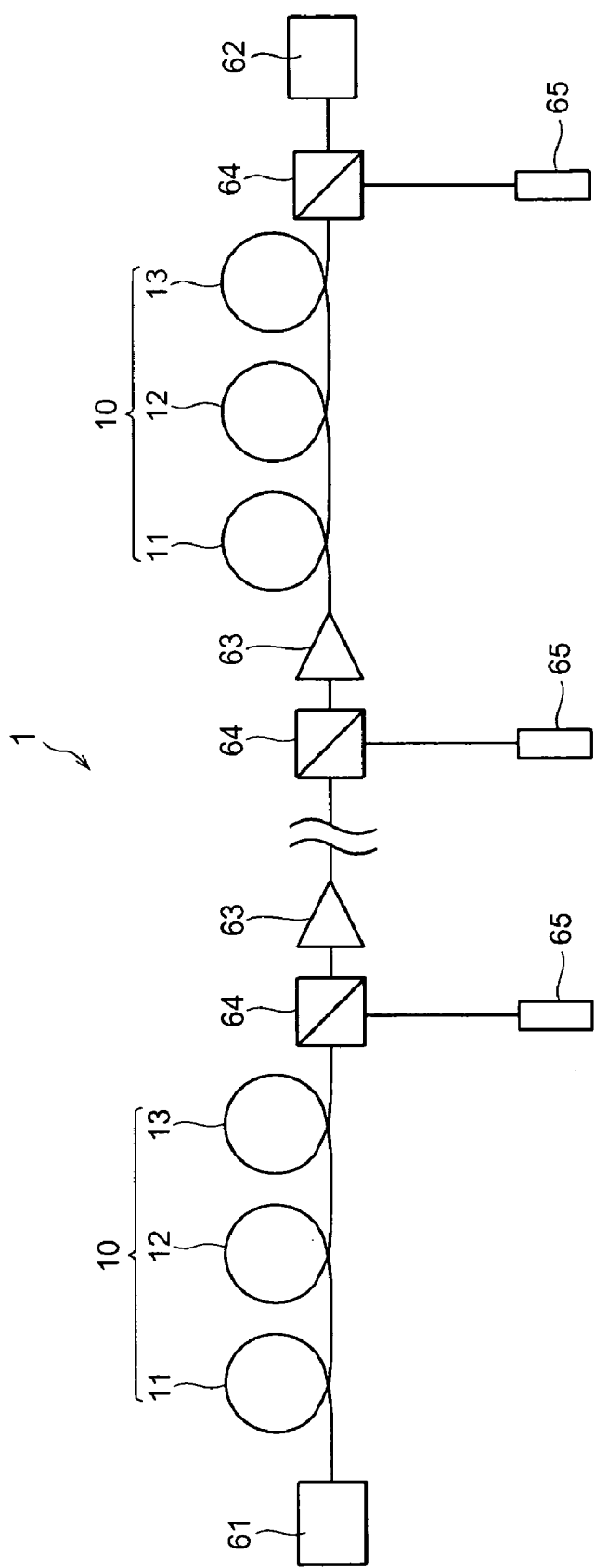
FIG. 1 is a schematic view showing one embodiment of an optical transmission line and an optical transmission system according to the present invention.

FIG. 1 is a schematic view showing one embodiment of an optical transmission line and an optical transmission system according to the present invention. An optical transmission system 1 comprises optical transmission lines 10, a transmitter 61, a receiver 62, and repeaters 63. Signal light outputted from the transmitter 61 is transmitted to the receiver 62 through the optical transmission lines 10. In this optical transmission system 1, a plurality of optical transmission lines 10 cascaded together with the repeaters 63 interposed therebetween constitute an overall signal light path extending from the transmitter 61 to the receiver 62. Herein, a section from the transmitter 61 to the repeater 63 disposed on the most upstream side in the signal light path, a section from a repeater 63 to another adjacent repeater 63, and a section from the repeater 63 disposed on the most downstream side in the signal light path to the receiver 62 are each called a "repeater section".

Each of the optical transmission lines 10 comprises a negative dispersion fiber 11 (first negative dispersion fiber), a positive dispersion fiber 12, and a negative dispersion fiber 13 (second negative dispersion fiber), which are cascaded in this order from the upstream side of the optical transmission line. These fibers 11, 12, and 13 transmit the signal light outputted from the transmitter 61 to the receiver 62. The negative dispersion fiber 11 has an absolute value of a dispersion slope of not larger than 0.03 ps/nm$^2$/km and overall dispersion of not larger than −5 ps/nm at one wavelength in the range of 1450 nm to 1600 nm. The one wavelength is, for example, 1550 nm. The other negative dispersion fiber 13 has overall dispersion of not larger than −5 ps/nm at the one wavelength. Further, the positive dispersion fiber 12 has overall dispersion selected so that the sum of the overall dispersion of the positive dispersion fiber 12 and the overall dispersion of the negative dispersion fiber 11 is not smaller than 5 ps/nm at the one wavelength.

The transmitter 61 comprises a plurality of light sources and a wavelength multiplexer (both not shown). The plurality of light sources each produce signal light of a different wavelength and output the produced signal light. The wavelength multiplexer multiplexes the signal light of different wavelengths outputted from the plurality of light sources and outputs the multiplexed signal light to the optical transmission line 10.

The receiver 62 comprises a wavelength demultiplexer and a plurality of light detectors (both not shown). The wavelength demultiplexer receives the signal light transmitted through the optical transmission line 10. The wavelength demultiplexer then demultiplexes the received signal light and outputs each signal light separated per wavelength. The light detectors detect the respective signal light thus demultiplexed and outputted from the wavelength demultiplexer.

The repeaters 63 are each disposed between two adjacent optical transmission lines 10. Each repeater 63 amplifies the signal light inputted from the optical transmission line 10 on the upstream side and outputs the amplified signal light to the optical transmission line 10 on the downstream side.

The optical transmission system 1 further comprises optical couplers 64 and pump sources 65. Each of the optical couplers 64 is disposed near the output end of the optical transmission line 10 in each repeater section. In the optical transmission line 10, the optical coupler 64 receives the signal light from the upstream side and outputs the received signal light to the downstream side. The pump sources' 65 are connected to the optical couplers 64 respectively. The pump source 65 is, for example, a semiconductor laser, and outputs pumping light for Raman amplification. The pumping light emitted from the pump source 65 is supplied to the optical transmission line 10 by the optical coupler 64.

In the optical transmission system 1 having the above-described construction, the signal light outputted from the transmitter 61 is inputted to the optical transmission line 10. The signal light inputted to the optical transmission line 10 is transmitted through the negative dispersion fiber 11, the positive dispersion fiber 12, and the negative dispersion fiber 13 over each repeater section. On the other hand, the pumping light for Raman amplification, outputted from the pump source 65, is supplied to the optical transmission line 10 by the optical coupler 64. The signal light transmitted through the repeater section is Raman-amplified with the pumping light. In addition, the signal light is also amplified by the repeater 63 at the boundary between two repeater sections adjacent to each other. Finally, the receiver 62 receives the signal light having been transmitted through all the repeater sections.

The advantages of the optical transmission line and the optical transmission system according to this embodiment are as follows. Of three optical fibers, i.e., the negative dispersion fiber 11, the positive dispersion fiber 12, and the negative dispersion fiber 13, constituting the optical transmission line 10, the optical fiber located in the most upstream part of each repeater section is the negative dispersion fiber 11. In this arrangement a pulse of signal light becomes broad because of negative dispersion characteristics of the most upstream optical fiber in which the power of the transmitted signal light is relatively high. Accordingly, the peak power of the signal light pulse is reduced, and hence the optical Kerr effect can be decreased. Further, in the negative dispersion fiber 11, there occur broadening of a signal light spectrum due to Self Phase Modulation (SPM) and broadening of the signal light pulse due to negative dispersion at the same time. The broadening of the signal light pulse makes the peak power level of the pulse lower. Therefore, the effect of nonlinearity in the fiber becomes weak with relatively short transmission distance and the pulse is not distorted with terribly complex waveform.

Further, the negative dispersion fiber 11 has the absolute value of the dispersion slope of not larger than 0.03 ps/nm$^2$/km at one wavelength in the range of 1450 nm to 1600 nm. Thus, since the absolute value of the dispersion slope is small in the most upstream optical fiber where the optical Kerr effect imposes a larger influence, distortion of the signal waveform can be easily reduced over a wide wavelength range of the signal light.

Still further, since the optical transmission line 10 comprises the negative dispersion fibers 11, 13 and the positive dispersion fiber 12, the absolute value of the accumulated dispersion of the entire optical transmission line 10 can be reduced by properly adjusting the respective chromatic dispersions of the optical fibers 11, 12 and 13. Accordingly, signal distortion caused by the dispersion can be sufficiently suppressed.

In addition, disposing the positive dispersion fiber 12 between the two negative dispersion fibers 11 and 13 makes it possible to prevent the absolute value of the accumulated dispersion from increasing beyond an allowable value midway in the optical transmission line 10. For example, if the negative dispersion fiber 13 is directly spliced to the negative dispersion fiber 11, the value of the accumulated dispersion would be excessively increased in the negative direction at the output end of the negative dispersion fiber 13.

The positive dispersion fiber 12 spliced to the negative dispersion fiber 11 acts to compress the pulse of the signal light of which spectrum has broadened with the SPM. In this connection, by setting the sum of the respective overall dispersions of the negative dispersion fiber 11 and the overall dispersion of the positive dispersion fiber 12 to take a positive value of not smaller than 5 ps/nm, it is expected that the pulse of the signal light just after being transmitted through the positive dispersion fiber 12 becomes sharper than at the time when it is inputted to the optical transmission line 10, and receiving sensitivity can be increased.

In the optical transmission system 1, both of the signal distortion due to the optical Kerr effect and the signal distortion due to the dispersion can be suppressed sufficiently because of the inclusion of the optical transmission line 10 as described above. Also, in the optical transmission system 1, the power of signal light can be prevented from being excessively reduced in each repeater section, because the optical coupler 64 and the pump source 65 are provided for supplying the pumping light for Raman amplification to the optical transmission line 10. If an optical transmission system does not require Raman amplification, the optical coupler 64 and the pump source 65 are unnecessary.

An effective core area $A_{eff}$ of the negative dispersion fiber 11 is, at the above-mentioned wavelength, preferably not smaller than 30 µm$^2$ but not larger than 60 µm$^2$, more preferably not smaller than 40 µm$^2$ but not larger than 60 µm$^2$, and even more preferably not smaller than 50 µm$^2$ but not larger than 60 µm$^2$. Under such conditions, the amount of non-linear phase shift in the negative dispersion fiber 11 can be restrained to be sufficiently small such that the degradation of transmission characteristics is insignificant for practical use.

Also, at the above-mentioned wavelength, the difference in mode field diameter (MFD) between the negative dispersion fiber 11 and the positive dispersion fiber 12 and the difference in MFD between the negative dispersion fiber 13 and the positive dispersion fiber 12 are each preferably not larger than 40% of the MFD of the positive dispersion fiber 12 and more preferably not larger than 20% of the MFD of the positive dispersion fiber 12. Under these conditions, it is possible to sufficiently reduce both of the splice loss between the negative dispersion fiber 11 and the positive dispersion fiber 12 and the splice loss between the positive dispersion fiber 12 and the negative dispersion fiber 13.

Further, at the above-mentioned wavelength, the absolute value of the dispersion slope of the positive dispersion fiber 12 is preferably not larger than 0.03 ps/nm$^2$/km. Similarly, at the above-mentioned wavelength, the absolute value of the dispersion slope of the negative dispersion fiber 13 is preferably not larger than 0.03 ps/nm$^2$/km. Under these conditions, it is possible to prevent the accumulated dispersion of the entire optical transmission line 10 from greatly differing depending on wavelength.

At the above-mentioned wavelength, the dispersion slope of the negative dispersion fiber 11 and that of the positive dispersion fiber 12 are preferably opposite to each other in sign. Under this condition, the differences in accumulated dispersion of the optical transmission line 10 in terms of wavelength can be further reduced.

The negative dispersion fiber 11 and the negative dispersion fiber 13 preferably have substantially equal lengths, and also substantially equal chromatic dispersions and dispersion slopes at the above-mentioned wavelength. Under these conditions, the optical transmission line 10 can be suitably used as a transmission line for two-way transmission. In this case, installation of the optical transmission line can be facilitated because it is unnecessary to install an individual optical transmission line for each direction of transmission.

At the above-mentioned wavelength, at least one of the negative dispersion fibers 11 and 13 preferably has a Raman gain coefficient ($gR/A_{eff}$) of not larger than 2.0/W/km. Under this condition, when the optical transmission line 10 is applied to WDM optical transmission, it is possible to prevent a tilt from being caused by the Raman gain interaction between signal channels.

Table I shows, by way of example, characteristics of optical fibers capable of being used as the negative dispersion fibers 11, 13 and the positive dispersion fiber 12, respectively. Table I shows values at the wavelength of 1550 nm.

TABLE I

|  | Fiber 11 | Fiber 12 | Fiber 13 |
| --- | --- | --- | --- |
| Chromatic dispersion (ps/nm/km) | −8 | 10 | −16 |
| Dispersion slope (ps/nm$^2$/km) | −0.006 | 0 | −0.01 |
| Overall length of fiber (km) | 30 | 40 | 10 |
| Loss (dB/km) | 0.2 | 0.2 | 0.21 |
| Effective core area (µm$^2$) | 47 | 51 | 42 |
| Mode field diameter (µm) | 7.7 | 8 | 7.4 |
| Raman gain coefficient (1/W/km) | 0.4 | 0.3 | 0.7 |

Alternatively, optical fibers having characteristics shown in Table II and Table III may be used as the negative dispersion fibers 11, 13 and the positive dispersion fiber 12, respectively.

TABLE II

|  | Fiber 11 | Fiber 12 | Fiber 13 |
|---|---|---|---|
| Chromatic dispersion (ps/nm/km) | −8 | 6 | −4 |
| Dispersion slope (ps/nm$^2$/km) | 0.03 | 0.02 | 0.06 |
| Overall length of fiber (km) | 20 | 40 | 20 |
| Loss (dB/km) | 0.2 | 0.2 | 0.2 |
| Effective core area (μm$^2$) | 45 | 53 | 50 |
| Mode field diameter (μm) | 7.5 | 8.2 | 7.9 |
| Raman gain coefficient (1/W/km) | 0.4 | 0.3 | 0.4 |

TABLE III

|  | Fiber 11 | Fiber 12 | Fiber 13 |
|---|---|---|---|
| Chromatic dispersion (ps/nm/km) | −16 | 10 | −16 |
| Dispersion slope (ps/nm$^2$/km) | −0.01 | 0 | −0.01 |
| Overall length of fiber (km) | 15 | 50 | 15 |
| Loss (dB/km) | 0.21 | 0.2 | 0.21 |
| Effective core area (μm$^2$) | 40 | 51 | 40 |
| Mode field diameter (μm) | 7.3 | 8 | 7.3 |
| Raman gain coefficient (1/W/km) | 0.8 | 0.3 | 0.8 |

Figure 2A:
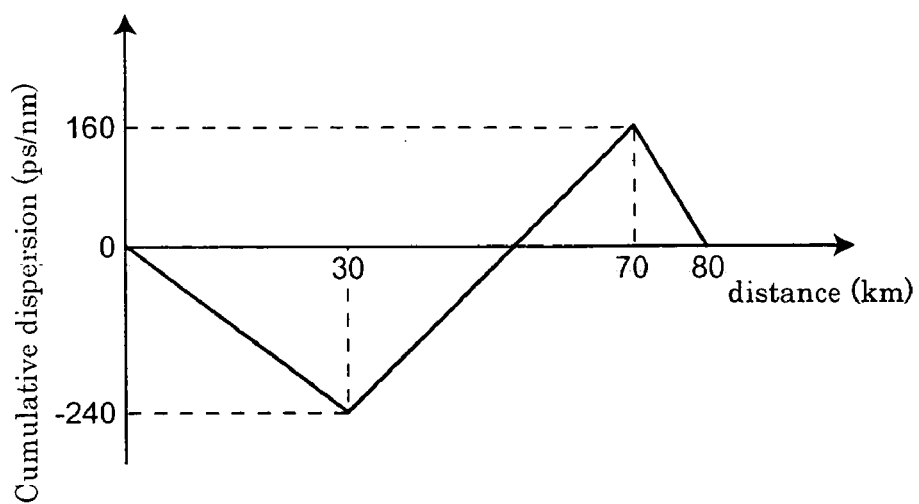
FIGS. 2A to 2C are graphs showing the relationships between accumulated dispersion of an optical transmission line 10 and distance from an input end of the line when optical fibers having characteristics shown in Table I to Table III are used respectively as negative dispersion fibers 11, 13 and a positive dispersion fiber 12.
Figure 2B:
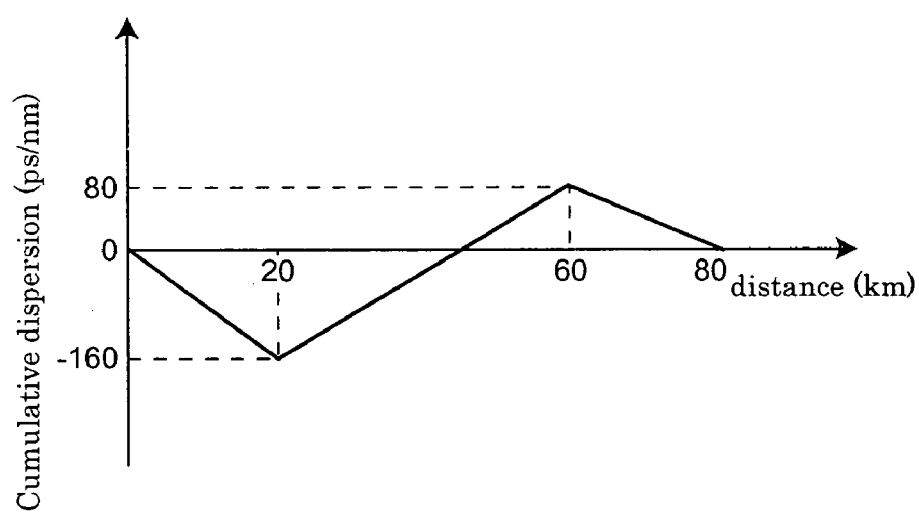
Figure 2C:
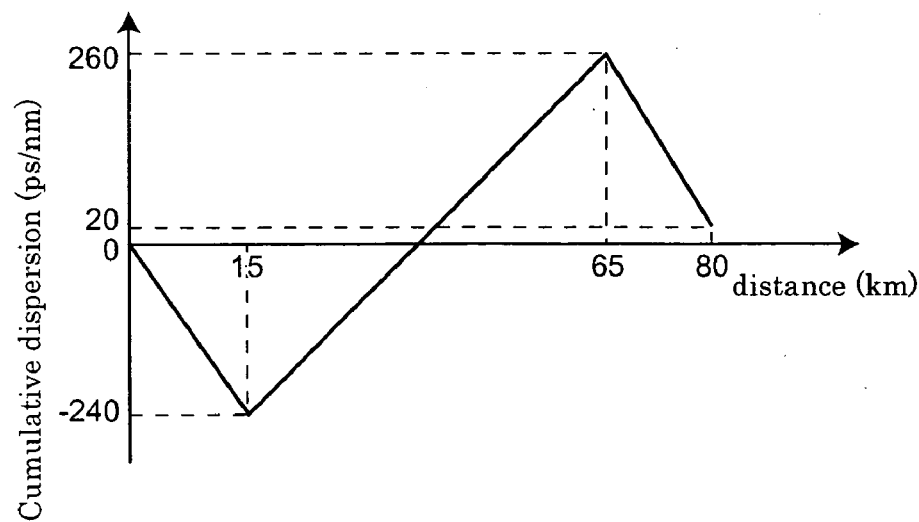

FIGS. 2A to 2C are graphs showing the relationships between accumulated dispersion of the optical transmission line 10 and distance from an input end of the line when optical fibers having characteristics shown in Table I to Table III are used respectively as the negative dispersion fibers 11, 13 and the positive dispersion fiber 12. In the graphs, the ordinate represents the accumulated dispersion, and the abscissa represents the distance from the input end. In FIG. 2A, for example, when the abscissa takes a value of 30 km, the ordinate takes a value of −240 ps/nm. This means that the accumulated dispersion from the input end is −240 ps/nm at a point 30 km from the input end of the optical transmission line 10, i.e., at the junction between the negative dispersion fiber 11 and the positive dispersion fiber 12. In other words, the overall dispersion of the negative dispersion fiber 11 is −240 ps/nm.

In each of the graphs shown in FIGS. 2A to 2C, a point where the value of the accumulated dispersion is minimized corresponds to the junction between the negative dispersion fiber 11 and the positive dispersion fiber 12, and a point where the value of the accumulated dispersion is maximized corresponds to the junction between the positive dispersion fiber 12 and the negative dispersion fiber 13. Further, in FIGS. 2A and 2B, the accumulated dispersion at the distance of 80 km from the input end, i.e., the overall dispersion of the optical transmission line 10, is 0, while in FIG. 2C it is 20 ps/nm/km, namely, not 0 ps/nm/km. When the overall dispersion of the optical transmission line 10 is set to a value other than 0 ps/nm/km at one wavelength of the signal light (1550 nm in this embodiment) as shown in FIG. 2C, it may be set to 0 ps/nm/km at any other wavelength of the signal light or to a value other than 0 ps/nm/km at any wavelength of the signal light.

Figure 3:
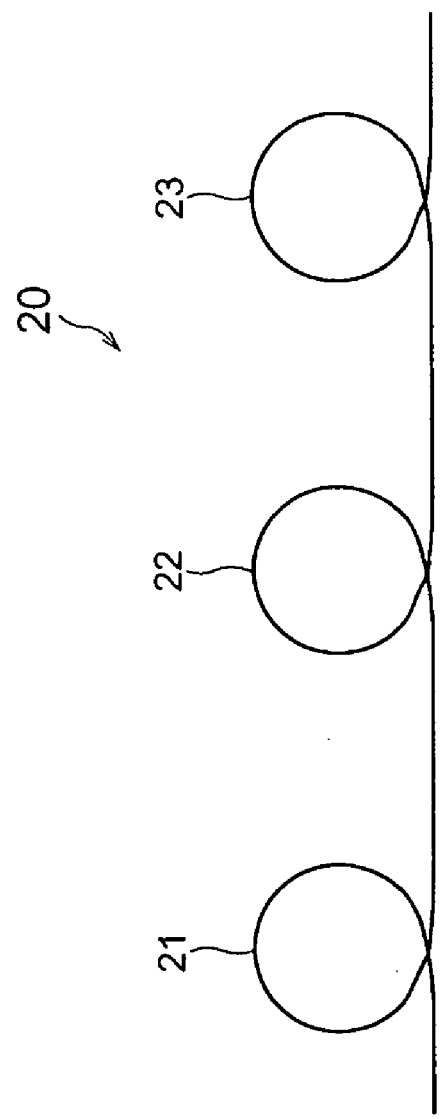
FIG. 3 is a schematic view showing one modification of the optical transmission line 10 shown in FIG. 1.

FIG. 3 is a schematic view showing one modification of the optical transmission line 10 shown in FIG. 1. An optical transmission line 20 of this embodiment comprises an optical fiber 21 (first optical fiber), an optical fiber 22 (second optical fiber), and an optical fiber 23 (third optical fiber), which are cascaded in this order. The optical transmission line 20 is disposed in each repeater section of the optical transmission system 1 such that the optical fiber 21 is located on the most upstream side and the optical fiber 23 is located on the most downstream side.

The optical fibers 21, 23 are identical fibers, each of which has negative dispersion and an absolute value of a dispersion slope of not larger than 0.03 ps/nm$^2$/km at one signal wavelength (e.g., 1550 nm), and which also have the same length and dispersion characteristics. Further, at the above-mentioned signal wavelength, an absolute value of the sum of respective overall dispersions of the optical fiber 21 and the optical fiber 22 is smaller than an absolute value of the overall dispersion of the optical fiber 21. In other words, a fiber having dispersion characteristics to compensate for the dispersion of the optical fiber 21 is employed as the optical fiber 22.

With the optical transmission system 1 employing the optical transmission line 20 thus constructed, since the optical fiber 21 located in the most upstream part of each repeater section has negative dispersion at the above-mentioned signal wavelength, there is the simple relationship between spectrum broadening and waveform distortion, which are caused by the optical Kerr effect and the dispersion. Accordingly, by adding dispersion having inverse sign, signal distortion can be sufficiently suppressed. Also, since the absolute value of the dispersion slope of the optical fiber 21 is not larger than 0.03 ps/nm$^2$/km at the above-mentioned signal wavelength, the optical transmission system 1 capable of satisfactorily transmitting light over a wide wavelength range can be realized.

Further, signal distortion due to dispersion can be sufficiently suppressed in the optical transmission system 1 employing the optical transmission line 20 because at the above-mentioned signal wavelength the absolute value of the sum of the overall dispersions of the optical fibers 21 and 22 is smaller than the absolute value of the overall dispersion of the optical fiber 21.

Moreover, the optical transmission line 20 includes the optical fiber 23 (third optical fiber) having the same length and dispersion characteristics as those of the optical fiber 21, and also having the negative chromatic dispersion and the absolute value of the dispersion slope of not larger than 0.03 ps/nm$^2$/km at the above-mentioned wavelength. With this feature, the optical transmission line 20 can be suitably used as a transmission line for two-way transmission.

Preferably, at the above-mentioned signal wavelength, the optical fiber 21 has an effective core area $A_{eff}$ of not larger than 60 μm$^2$ and a non-linear constant γ larger than that of the optical fiber 22. Here, there is a relationship $\gamma=(2\pi n_2)/(\lambda A_{eff})$, wherein λ is a wavelength of signal light and $n_2$ is the non-linear refractive index.

Figure 4:
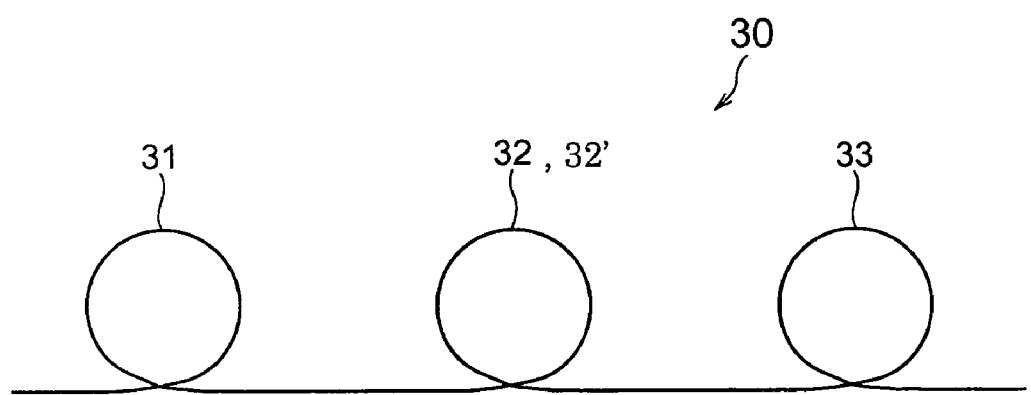
FIG. 4 is a schematic view showing another modification of the optical transmission line 10 shown in FIG. 1.

FIG. 4 is a schematic view showing another modification of the optical transmission line 10 shown in FIG. 1. An optical transmission line 30 of this embodiment comprises a negative dispersion fiber 31, a dispersion shifted fiber 32 (intermediate fiber), and a positive dispersion fiber 33, which are cascaded in this order. The optical transmission line 30 is disposed in each repeater section of the optical transmission system 1 such that the negative dispersion fiber 31 is located on the most upstream side and the positive dispersion fiber 33 is located on the most downstream side.

The negative dispersion fiber 31 has an absolute value of the dispersion slope of not larger than 0.03 ps/nm$^2$/km and overall dispersion of not larger than −5 ps/nm at one wavelength in the range of 1450 nm to 1600 nm. The dispersion shifted fiber 32 has chromatic dispersion of 0 ps/nm/km at the above-mentioned wavelength. At the above-mentioned wavelength, the sum of the overall dispersions of the negative dispersion fiber 31 and the positive dispersion fiber 33 is not smaller than 0 ps/nm.

With the optical transmission line 30 thus constructed, since the negative dispersion fiber 31 is located in the most upstream part of each repeater section, the spectrum and waveform of signal light have a relatively simple relation ship. Also, since the absolute value of the dispersion slope of the negative dispersion fiber 31 is not larger than 0.03 ps/nm²/km at the above-mentioned wavelength, the optical transmission line 30 can transmit light satisfactorily over a wide wavelength range.

Further, since the optical transmission line 30 comprises the negative dispersion fiber 31 and the positive dispersion fiber 33, the absolute value of the accumulated dispersion of the entire optical transmission line 30 can be reduced by properly adjusting the respective chromatic dispersions of the optical fibers 31, 33. As a result, signal distortion due to dispersion can be sufficiently suppressed. In particular, it is expected that since the sum of the overall dispersion of the negative dispersion fiber 31 and the overall dispersion of the positive dispersion fiber 33 is not smaller than 0 ps/nm, the pulse of signal light be sharper at the time just after the signal light has traveled through the optical transmission line 30 than at the time when it was input to the optical transmission line 30, and thereby the receptibility of the signal light can be improved.

Moreover, because of the structure in which the dispersion shifted fiber 32 is disposed between the negative dispersion fiber 31 and the positive dispersion fiber 33, the absolute value of the accumulated dispersion can be prevented from increasing beyond an allowable value midway in the optical transmission line 30, and negative accumulated dispersion can be maintained. As a result, according to the optical transmission line 30, the length of the transmission line can be increased while keeping excellent transmission characteristics.

In the optical transmission line 30, a dispersion managed fiber 32' having overall dispersion of substantially 0 ps/nm may be substituted for the dispersion shifted fiber 32 having chromatic dispersion of substantially 0 ps/nm/km at the above-mentioned wavelength.

Table IV shows, by way of example, characteristics of optical fibers which can be used as the negative dispersion fiber 31, the dispersion managed fiber 32' and the positive dispersion fiber 33, respectively. Table IV represents values at the wavelength of 1550 nm. The dispersion managed fiber 32' is formed by combining a positive dispersion fiber part and a negative dispersion fiber part, and some of its features are expressed in the form of (characteristics of the positive dispersion fiber part)/(characteristics of the negative dispersion fiber part) in the table column.

TABLE IV

|  | Fiber 31 | Fiber 32' | Fiber 33 |
| --- | --- | --- | --- |
| Chromatic dispersion (ps/nm/km) | −8 | 8/−8 | 17.5 |
| Dispersion slope (ps/nm²/km) | −0.006 | 0.01/−0.01 | 0.06 |
| Overall length of fiber (km) | 22 | 48 | 10 |
| Loss (dB/km) | 0.2 | 0.2 | 0.2 |
| Effective core area (µm²) | 47 | 51/47 | 85 |
| Mode field diameter (µm) | 7.7 | 8/7.7 | 10.5 |
| Raman gain coefficient (1/W/km) | 0.4 | 0.4/0.3 | 0.2 |

Figure 5:
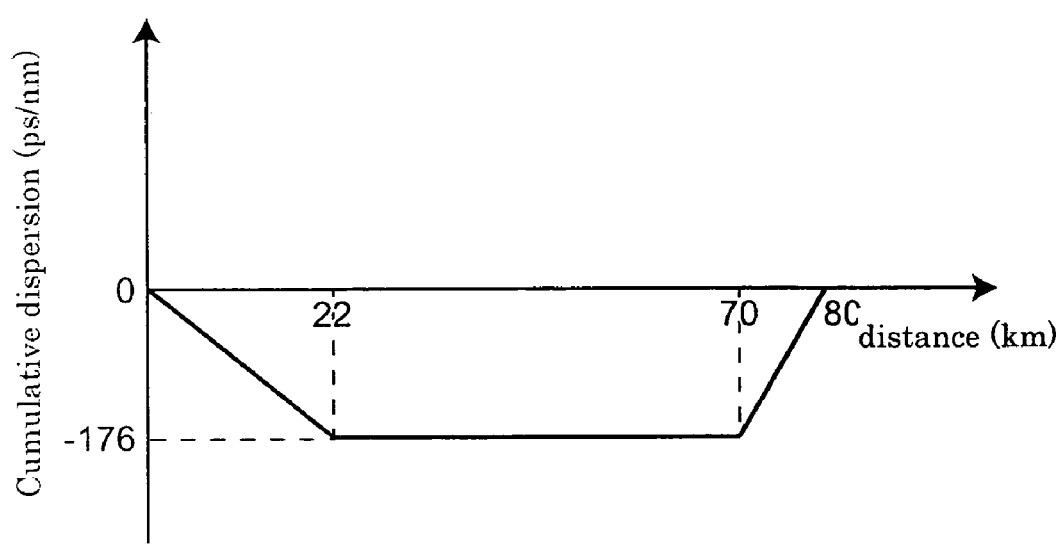
FIG. 5 is a graph showing the relationship between accumulated dispersion of an optical transmission line 30 and distance from an input end of the line when optical fibers having characteristics shown in Table IV are used respectively as a negative dispersion fiber 31, a dispersion managed fiber 32', and a positive dispersion fiber 33.

FIG. 5 is a graph showing the relationship between accumulated dispersion of the optical transmission line 30 and distance from an input end of the line when the optical fibers having characteristics shown in Table IV are used respectively as the negative dispersion fiber 31, the dispersion managed fiber 32', and the positive dispersion fiber 33. The ordinate of the graph represents the accumulated dispersion, and the abscissa represents the distance from the input end. In the graph, a region where the accumulated dispersion has a constant value corresponds to the dispersion managed fiber 32'.

Figure 6:
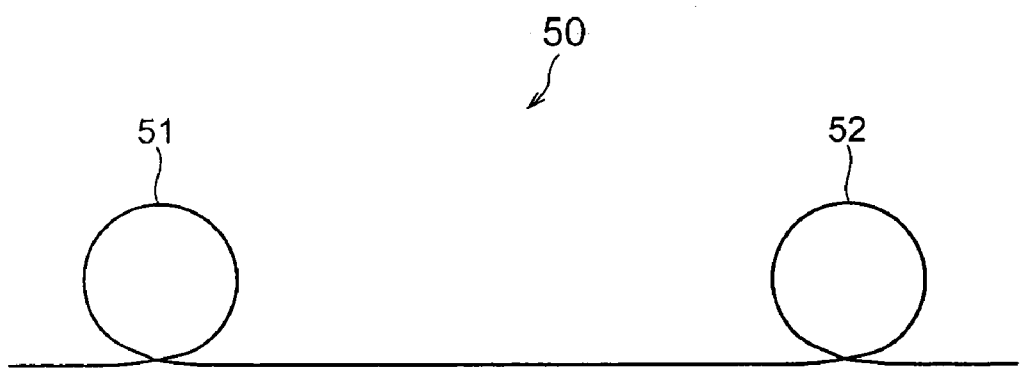
FIG. 6 is a schematic view showing still another modification of the optical transmission line 10 shown in FIG. 1.

FIG. 6 is a schematic view showing still another modification of the optical transmission line 10 shown in FIG. 1. An optical transmission line 50 of this embodiment comprises a negative dispersion fiber 51 and a positive dispersion fiber 52, which are cascaded together in series. The optical transmission line 50 is disposed in each repeater section of the optical transmission system 1 such that the negative dispersion fiber 51 is located on the upstream side and the positive dispersion fiber 52 is located on the downstream side.

The negative dispersion fiber 51 has an absolute value of the dispersion slope of not larger than 0.03 ps/nm²/km and overall dispersion of not larger than −5 ps/nm at one wavelength in the range of 1450 nm to 1600 nm. Further, the sum L of the length of the negative dispersion fiber 51 and the length of the positive dispersion fiber 52 is not smaller than 10 km and, at the above-mentioned wavelength, the sum of overall dispersions of the negative dispersion fiber 51 and the positive dispersion fiber 52 is not smaller than 5 ps/nm but not larger than 0.5 ps/nm/km×L.

With the optical transmission line 50 thus constructed, since the negative dispersion fiber 51 is located in the most upstream part of each repeater section, the spectrum and waveform of signal light have a relatively simple relation ship. Also, since the absolute value of the dispersion slope of the negative dispersion fiber 51 is not larger than 0.03 ps/nm²/km at the above-mentioned wavelength, the optical transmission line 50 can satisfactorily transmit light over a wide wavelength range.

Further, since the optical transmission line 50 comprises the negative dispersion fiber 51 and the positive dispersion fiber 52, the absolute value of the accumulated dispersion of the entire optical transmission line 50 can be reduced by properly adjusting the respective chromatic dispersions of the optical fibers 51, 52. As a result, signal distortion due to dispersion can be sufficiently suppressed. In fact, the sum of the overall dispersion of the negative dispersion fiber 51 and the overall dispersion of the positive dispersion fiber 52 is not larger than 0.5 ps/nm/km×L, and the accumulated dispersion of the entire optical transmission line 50 is suppressed to be small. Moreover, since the sum of the overall dispersion of the negative dispersion fiber 51 and the overall dispersion of the positive dispersion fiber 52 is designed to be not smaller than 5 ps/nm, it is expected that the pulse of the signal light just after being transmitted through the optical transmission line 50 becomes sharper than at the time when it was inputted to the optical transmission line 50, and thereby the receptibility of the signal light can be improved.

Figure 7:
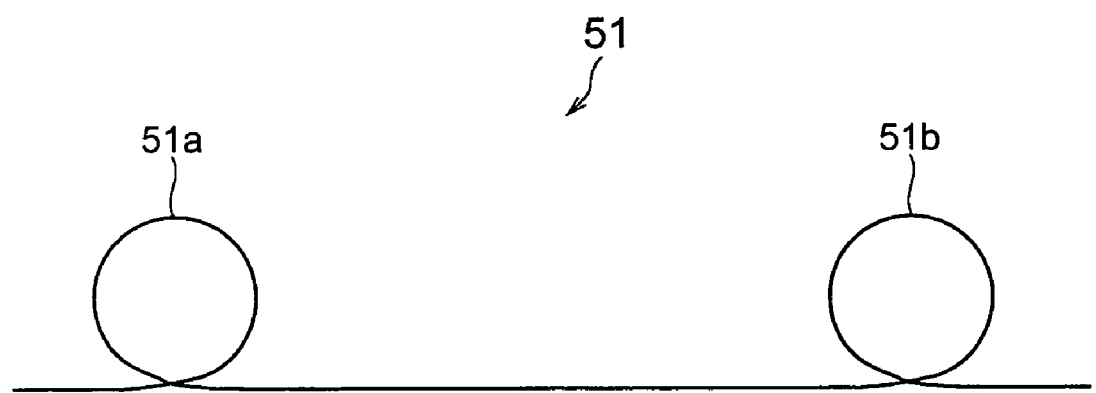
FIG. 7 is a schematic view showing one example of the construction of a negative dispersion fiber 51 shown in FIG. 6.

FIG. 7 is a schematic view showing one example of the construction of the negative dispersion fiber 51 shown in FIG. 6. The negative dispersion fiber 51 comprises two cascaded negative dispersion fibers 51a, 51b having MFD values different from each other. One end of the negative dispersion fiber 51a is connected to the output fiber (output end) of the transmitter 61 or a repeater 63 in the optical transmission system 1, and one end of the negative dispersion fiber 51b is connected to the input end of a positive dispersion fiber 52.

The negative dispersion fibers 51a, 51b are designed to have MFD values such that the splice loss with respect to the fiber 51a and the output fiber and the splice loss between the fiber 51b and the positive dispersion fiber 52 are not larger than an allowable value (1.1 dB), respectively. With this feature, the splice losses at both the input and output ends of the negative dispersion fiber 51 can be suppressed to be small. The negative dispersion fiber 51 may be structured such that one or more negative dispersion fibers are inserted between the negative dispersion fibers 51a and 51b. For example, a negative dispersion fiber having an MFD of intermediate value relative to the MFD values of the fibers 51a and 51b may be inserted between the negative dispersion fibers 51a and 51b so that the splice loss between the negative dispersion fibers 51a and 51b can be decreased.

Figure 8:
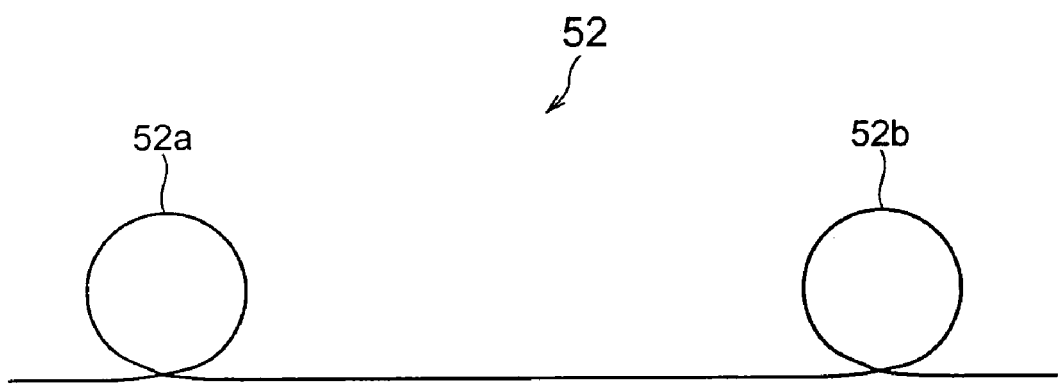
FIG. 8 is a schematic view showing one example of the construction of a positive dispersion fiber 52 shown in FIG. 6.

Likewise, as shown in FIG. 8, the positive dispersion fiber 52 preferably comprises two positive dispersion fibers 52a, 52b cascaded together in series and each having a MFD such that the splice loss with respect to the fiber 52a and the negative dispersion fiber 51 and the splice loss with respect to the fiber 52b and the input fiber (input end) of a repeater 63 (or the receiver 62) are not larger than the allowable value, respectively.

Figure 9:
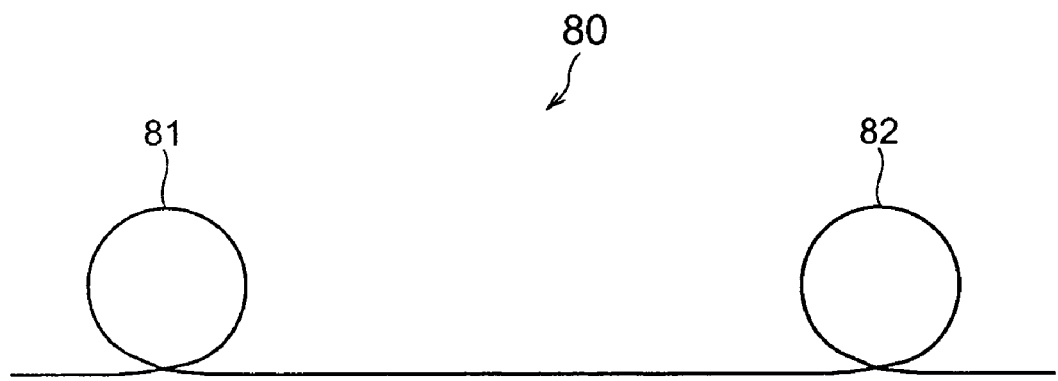
FIG. 9 is a schematic view showing an optical transmission line, which was used in experiments for confirming the effect of the optical transmission line according to the embodiment shown in FIG. 1.

FIG. 9 is a schematic view showing an optical transmission line, which was used in experiments for confirming the effect of the optical transmission line according to the embodiment shown in FIG. 1. An optical transmission line 80 of this embodiment comprises two optical fibers 81 and 82 cascaded together in series. Both of the optical fibers 81 and 82 have a length of 40 km. The chromatic dispersion of the optical fiber 82 is opposite in sign to that of the optical fiber 81, but it has the same absolute value as that of the optical fiber 81.

In the experiments, power penalty was measured when the optical transmission line 80 is applied to a WDM optical transmission system. More specifically, in this system, each repeater section was constituted by the optical transmission line 80. The optical fiber 81 was disposed in the most upstream part of each repeater section, and the optical fiber 82 was disposed in the most downstream part of each repeater section. In this system, the number of wavelengths (i.e., the number of channels) of signal light was 8, the input power of signal light introduced to the optical transmission line 80 was −2 dBm per channel, and the number of repeater sections was 5. The signal light used in the experiments had a non-return-to-zero (NRZ) waveform and was free of any chirp.

Figure 10A:
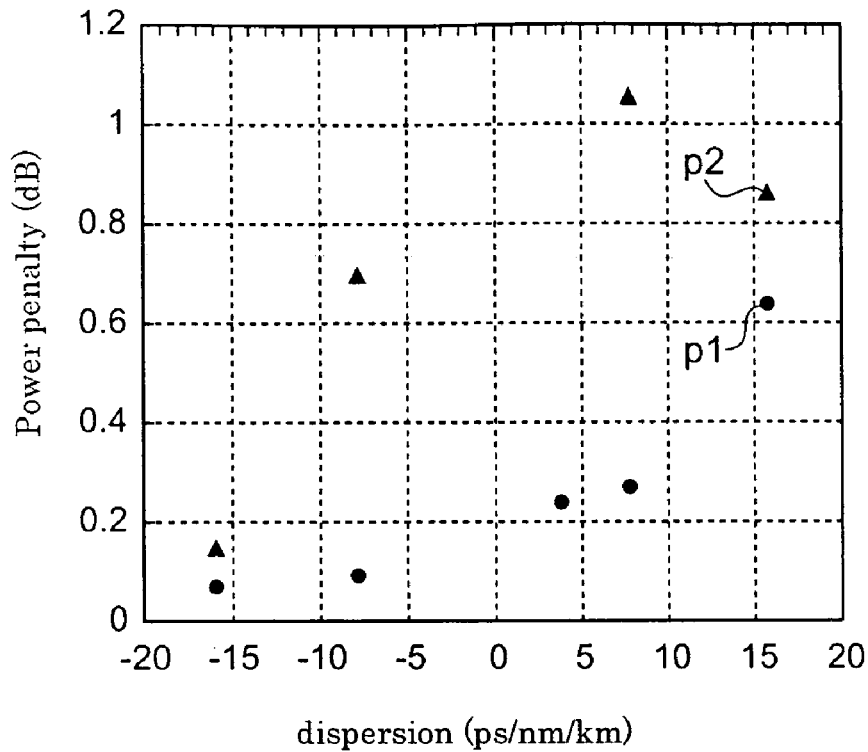
FIGS. 10A and 10B are graphs showing results of measuring the relationship between power penalty and chromatic dispersion of an optical fiber 81 in the experiments using the optical transmission line shown in FIG. 9.
Figure 10B:
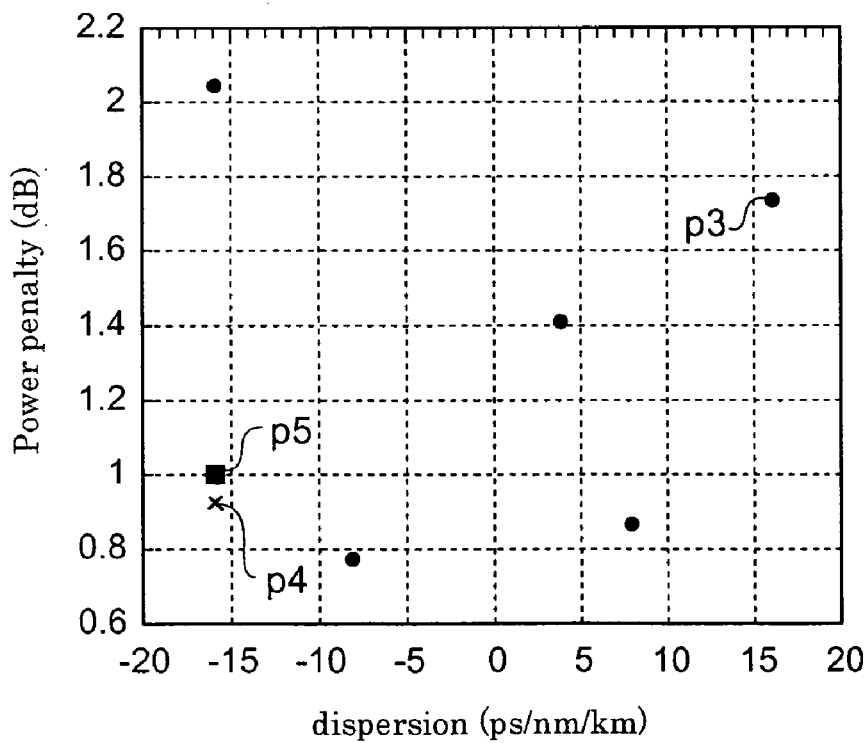

FIGS. 10A and 10B are graphs showing results of measuring the relationship between power penalty and chromatic dispersion of the optical fiber 81 in the experiments using the optical transmission line shown in FIG. 9. Each of these graphs shows the power penalty in the worst channel, i.e., the channel in which the power penalty is maximized. In the graph, the ordinate represents the power penalty (dB), and the abscissa represents the dispersion of the optical fiber 81.

In FIG. 10A, the bit rate in each channel is 10 Gb/s. Also, plots p1 denoted by circular marks and plots p2 denoted by triangular marks in the graph represent respectively the results measured at channel intervals of 100 GHz and 50 GHz. As seen from the graph of FIG. 10A, the power penalty is reduced in the case where the optical fiber 81 on the upstream side has a negative dispersion than in the case where it has a positive dispersion.

On the other hand, in FIG. 10B, the bit rate in each channel is 40 Gb/s. Also, plots p3 denoted by circular marks in the graph represent the results measured at channel intervals of 100 GHz. As seen from the graph of FIG. 10B, even with the optical fiber 81 having negative dispersion, the power penalty is increased if the absolute value of the negative dispersion is too large (see the plot resulting when the chromatic dispersion of the optical fiber 81 is −16 ps/nm/km). This is presumably attributable to that the absolute value of the accumulated dispersion becomes too large beyond the allowable value midway in the optical transmission line 80, particularly near the output end of the optical fiber 81.

In order to prevent the absolute value of the accumulated dispersion from becoming too large in the course of the optical transmission line 80, the optical fiber 81 shown in FIG. 9 was divided into two parts and the optical fiber 82 was disposed between the divided parts of the optical fiber 81. More specifically, the optical transmission line thus modified is constituted by the first half part of the optical fiber 81 for 20 km from the input end, the optical fiber 82 for a subsequent distance of 40 km, and the second half of the optical fiber 81 for a final distance of 20 km up to the output end. The plot p4 denoted by the mark x in FIG. 10B represents the result of measuring the power penalty in this optical transmission line when the optical fiber 81 was designed to have a dispersion of −16 ps/nm/km. As seen from the plot p4, the power penalty of this optical transmission line is greatly reduced in comparison with that of the optical transmission line having the construction shown in FIG. 9. In other words, from this result, it was confirmed that the optical transmission line including the positive dispersion fiber disposed between the two negative dispersion fibers had excellent transmission characteristics.

The structure of the optical transmission line shown in FIG. 9 was further modified such that a dispersion managed fiber of 50 km length having overall dispersion of 0 ps/nm was interposed between the optical fiber 81 and the optical fiber 82, the lengths of which were adjusted so that the overall length of the optical transmission line was constant. More specifically, the modified optical transmission line had the optical fiber 81 for a first distance of 15 km from the input end, the dispersion managed fiber for a subsequent distance of 50 km, and the optical fiber 82 for the remaining distance of 15 km up to the output end. The plot p5 denoted by a square mark in FIG. 10B represents a result of measuring the power penalty in this optical transmission line when the dispersion of the optical fiber 81 was designed to be −16 ps/nm/km. As seen from the plot p5, the power penalty of this optical transmission line is greatly reduced in comparison with that of the optical transmission line having the construction shown in FIG. 9. This result has proved that an optical transmission line including a dispersion managed fiber interposed between a negative dispersion fiber and a positive dispersion fiber exhibits excellent transmission characteristics.

As for the dispersion of the optical fiber 81, there is a specific desirable range even in the negative dispersion, as can be seen from the graph of FIG. 10B. The reason is that if the absolute value of the dispersion is too large, the absolute value of the accumulated dispersion is excessively increased as described above, and conversely if the absolute value of the dispersion is too small, the non-linear interaction between the signal channels is increased. Particularly, for long-distance transmission over several hundreds kilometers or more, a desirable dispersion is in a range of −12 ps/nm/km to −6 ps/nm/km. As for a wavelength range of signal light, at least 200 nm ranging from 1410 nm to 1610 nm will be required to achieve tera-bit transmission. Therefore, it can be said that the dispersion slope of the optical fiber 81 is preferably not larger than 0.03 ps/nm/km.

Figure 11:
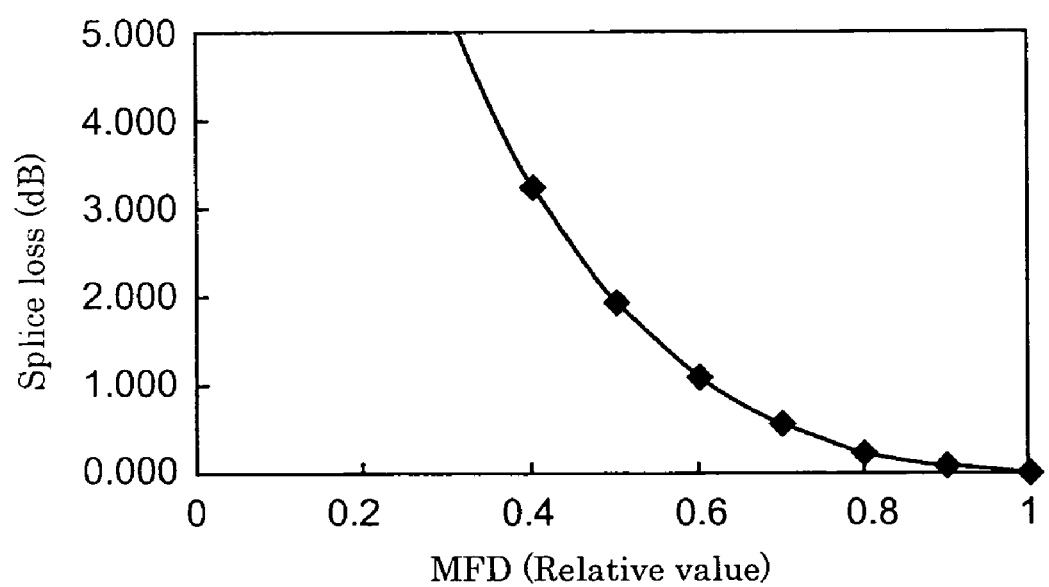
FIG. 11 is a graph showing results of experiments for measuring the relationship between splice loss and MFD ratio of two optical fibers when the two optical fibers are spliced to each other.

FIG. 11 is a graph showing the results of experiments for measuring the relationship between splice loss and MFD ratio of two optical fibers spliced together. In the graph, the ordinate represents the splice loss (dB), and the abscissa represents the MFD ratio of the two optical fibers. Here, the MFD ratio is obtained by dividing a smaller MFD by a larger MFD. In a metropolitan area network and a medium-distance land system, there is no problem from the practical point of view if the splice loss can be suppressed to a value not larger than 1 dB. To satisfy this condition, as seen from the graph, the MFD ratio is required to be not smaller than 0.6. Also, in a long-distance system, it is desired that the splice loss be suppressed not larger than 0.2 dB. To satisfy this condition, the MFD ratio is required to be not smaller than 0.8.

Figure 12:
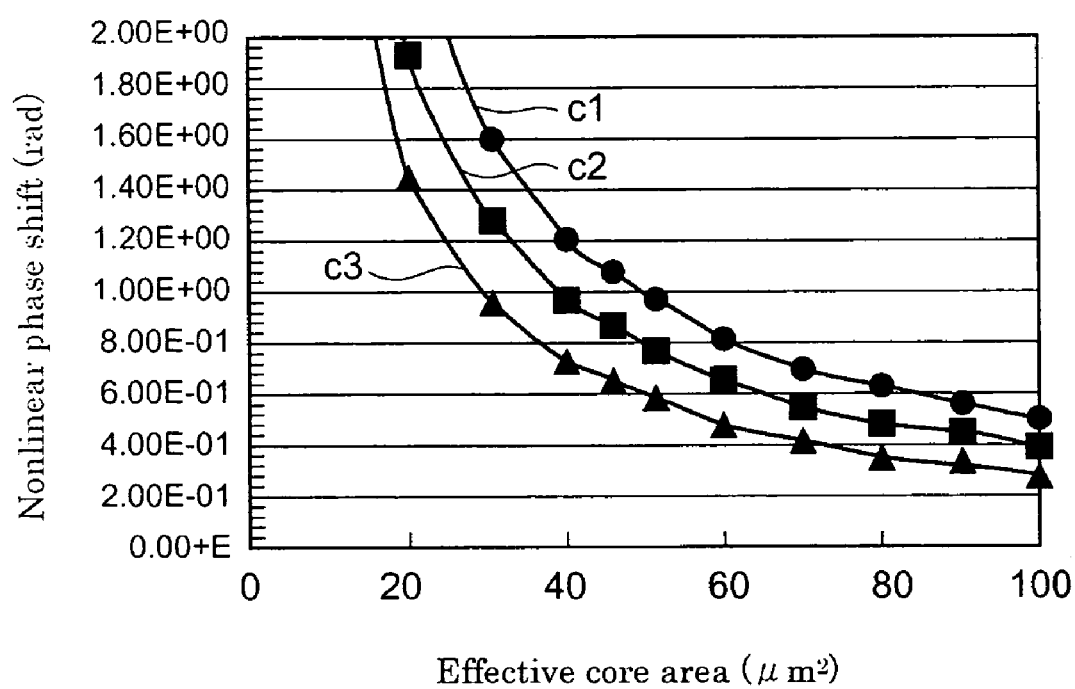
FIG. 12 is a graph showing results of experiments for measuring the relationship between the amount of non-linear phase shift and effective core area in the optical fiber.

FIG. 12 is a graph showing the results of experiments for measuring the relationship between an amount of non-linear phase shift and effective core area in an optical fiber. In the graph, the ordinate represents the non-linear phase shift (rad), and the abscissa represents the effective core area ($A_{eff}$). Curves c1 to c3 in the graph represent the results obtained when power $P_{in}$, of the light entering the optical fiber was set to 5 mW, 4 mW and 3 mW, respectively. The experiments were conducted under the conditions where the length of the optical fiber was 80 km, the non-linear refractive index $n_2$ was $3.0 \times 10^{-20}$ m$^2$/W, and the wavelength of signal light $\lambda_S$ was 1550 nm.

If the amount of a non-linear phase shift is not larger than 1.0 rad, the degradation of transmission characteristics can be suppressed to a level which is allowable from the practical point of view. In an optical transmission system not employing light amplifiers, such as a metropolitan area network, an upper limit of $P_{in}$ is about 3 mW at the present time. In this case, as seen from the graph, if $A_{eff}$ is not smaller than 30 μm$^2$, the amount of the non-linear phase shift can be suppressed to a value not larger than 1.0 rad. Also, in WDM optical transmission through a land system, $P_{in}$ of not larger than 4 mW per channel is presumably a suitable operating condition under which system devices can operate satisfactorily. In this case, as seen from the graph, if $A_{eff}$ is not smaller than 40 μm$^2$, the amount of the non-linear phase shift can be suppressed to a value not larger than 1.0 rad. Further, when $P_{in}$ is increased in consideration of a loss margin as practiced in some cases, it is possible to increase $P_{in}$ up to 7 dBm (about 5 mW) at the possible limit per channel at the present time. In this case, as seen from the graph, if $A_{eff}$ is not smaller than 50 μm$^2$, the amount of the non-linear phase shift can be suppressed to a value not larger than 1.0 rad.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

The entire disclosure of Japanese Patent Application No. 2003-117268 filed on Apr. 22, 2003 including specification, claims, drawings and summary is incorporated herein by reference in its entirety.

What is claimed is:

1. An optical transmission system comprising a transmitter for outputting signal light and an optical transmission line for transmitting the signal light outputted from said transmitter, said optical transmission line comprising a first optical fiber disposed in the most upstream part of said optical transmission line and a second optical fiber spliced to said first optical fiber, wherein said first optical fiber has negative chromatic dispersion, an absolute value of a dispersion slope of not larger than 0.03 ps/nm$^2$/km, and a non-linear constant γ larger than that of said second optical fiber at any one wavelength of the signal light, where $\gamma=(2\pi n_2)/(\lambda A_{eff})$, λ is a wavelength of signal light, and $n_2$ is the non-linear refractive index, and the absolute value of the sum of overall dispersion of said first optical fiber and overall dispersion of said second optical fiber is smaller than the absolute value of the overall dispersion of said first optical fiber at said one wavelength.

2. An optical transmission system according to claim 1, wherein said optical transmission line further comprises a third optical fiber disposed in the most downstream part of said optical transmission line, and said third optical fiber has negative chromatic dispersion and an absolute value of a dispersion slope of not larger than 0.03 ps/nm$^2$/km at said one wavelength.

3. An optical transmission system according to claim 1, wherein said first optical fiber has an effective core area of not larger than 60 μm$^2$ and has a larger non-linear constant than said second optical fiber, and the sum of overall dispersion of said first optical fiber and overall dispersion of said second optical fiber is positive.

4. An optical transmission system according to claim 1, further comprising a light source for outputting pumping light for Raman amplification to be supplied to said optical transmission line.

* * * * *